US011859801B1

(12) United States Patent
Hwang

(10) Patent No.: US 11,859,801 B1
(45) Date of Patent: Jan. 2, 2024

(54) ADJUSTABLE OUTDOOR SOLAR SPOTLIGHT WITH VARIOUS FIXING METHODS

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 18/107,662

(22) Filed: Feb. 9, 2023

(51) Int. Cl.
*F21V 21/30* (2006.01)
*F21V 21/08* (2006.01)
*F21S 9/03* (2006.01)

(52) U.S. Cl.
CPC .............. *F21V 21/30* (2013.01); *F21S 9/032* (2013.01); *F21V 21/0824* (2013.01)

(58) Field of Classification Search
CPC .. F21S 9/032; F21S 9/035; F21S 9/037; F21S 9/03; F21V 21/0824; F21V 21/30; F21V 21/26; F21V 21/28; F21V 21/29
See application file for complete search history.

(56) References Cited

U.S. PATENT DOCUMENTS 9,197,033 B1 * 11/2015 Tsai ...................... H01S 5/4093
D881,433 S * 4/2020 Chen .............................. D26/63
2005/0103378 A1 * 5/2005 Pu ....................... F21V 21/0824 136/291
2007/0014115 A1 * 1/2007 Katz ....................... F21V 21/30 362/382
2013/0223049 A1 * 8/2013 Katsaros ................. F21V 17/12 362/183
2015/0159842 A1 * 6/2015 Zhang ..................... F21V 31/00 362/231
2016/0238221 A1 * 8/2016 Lentine ................. F21S 10/007
2020/0072450 A1 * 3/2020 Mullen ................... F21V 21/28
2022/0003396 A1 * 1/2022 Saboo ..................... F21V 21/30

FOREIGN PATENT DOCUMENTS

CN 106764842 A * 5/2017

OTHER PUBLICATIONS

Machine translation of Pan, CN-106764842-A, published May 31, 2017 (Year: 2017).*

* cited by examiner

*Primary Examiner* — William N Harris
(74) *Attorney, Agent, or Firm* — BACON & THOMAS, PLLC

(57) ABSTRACT

An adjustable solar spotlight with various fixing methods includes a positioning stand for pivoting a lamp head, and a solar power supply module that can be connected to the lamp head through a pivot assembly, and the positioning stand can be used for plugging in the lamp head or fixing to the ground or hanging for positioning, and the solar power supply module can be deflected upwardly or downwardly relative to the lamp head and can be rotated using the pivot assembly as an axis in order to adjust angles towards different directions and improve the charging efficiency.

7 Claims, 7 Drawing Sheets

ADJUSTABLE OUTDOOR SOLAR SPOTLIGHT WITH VARIOUS FIXING METHODS

TECHNICAL FIELD OF THE DISCLOSURE

The present disclosure relates to an adjustable solar spotlight with various fixing methods, and more particularly to the spotlight that integrates the functions of plugging into the ground, fixing on a plane, or hanging and positioning the spotlight, in addition to adjusting the irradiation angle, and the solar panel of the spotlight can be adjusted in a multiple of angles or adjusted in a direction facing the sun to improve the charging efficiency of the spotlight.

DESCRIPTION OF RELATED ART

Spotlights for outdoor use are mostly installed in outdoor environments such as gardens, homes, or around buildings to provide appropriate lighting. A conventional spotlight generally includes an LED lamp head, a solar power supply module, and a positioning device fixed to the back or the bottom of the LED lamp head, and the solar power supply module has a solar panel capable of receiving and converting solar radiation into electrical energy for charging the battery, and supplying the electrical energy for the operation of the spotlight, and thus having the advantages of environmental protection and energy saving.

Attentions should be paid to the installation of the spotlight. For example, it is necessary to consider the change of angular movements of the sun to allow the solar panel to have a better light collection effect.

In addition, the light source of LED has high directivity and is limited by the structural design of being installed on one side of the circuit board, so that the spotlight can only project light on a single direction, and the illumination range will be small. When other areas need to be illuminated, it is necessary to change the direction of the LED lamp head, or install another spotlight.

Most positioning devices of the conventional spotlight are conical ground plugs or plate-shaped fixing disk used to fix the spotlight on the ground of a garden walkway, or screws or nails are used to fix the positioning plate and spotlight on columns, walls or other positions. However, when there is a place that cannot be fixed with screws or nails, it is necessary to find another way such as a hanging method to position the spotlight. Therefore, how to integrate various positioning methods and allow the solar power supply module play a better light collection effect is a main subject of this disclosure

SUMMARY OF THE DISCLOSURE

Specifically, this disclosure is directed to an adjustable solar spotlight with various fixing methods, and the adjustable solar spotlight includes:

- a lamp head, further comprising a casing, and the casing having an illuminated front, a back configured to be opposite to the front, and two sides disposed between the front and the back;
- a positioning stand, having a rod body disposed under the positioning stand, and the rod body having a top end and a bottom end, and the top end of the rod body being split and extended outwardly to form two pivot rods arranged in a substantially V-shape, and the lamp head being installed between the two pivot rods, and two sides of the casing being respectively and pivotally coupled to the pivot rods, such that the front of the lamp head can be deflected towards the top or bottom relative to the positioning stand to provide lighting, and a hook part provided for hanging being formed at the joint position of the top end of the rod body and the two pivot rods;
- a solar power supply module, having a main body electrically coupled to the lamp head, and the main body having an assembling part; and
- a pivot assembly, installed between the back of the lamp head casing and the assembling part of the solar power supply module, and having two ends communicated with each other, and one of the ends being axially coupled to the back of the lamp head casing by a rotating part, such that the solar power supply module can use the rotating part as an axis to rotate relative to the lamp head, and the other end of the pivot assembly being pivotally coupled to the assembling part of the solar power supply module by a pivot part, such that the solar power supply module can be deflected upwardly or downwardly relative to the lamp head through the pivot part, so as to adjust angles towards different directions to receive and convert solar radiation into electrical energy to charge a battery.

Compared with the related art, the lamp head of this disclosure not just can be deflected upwardly or downwardly relative to the positioning stand only, but also can be used to provide different lighting angles, and the solar power supply module can also be deflected upwardly or downwardly relative to the lamp head through the pivot part of the pivot assembly, or can be axially rotated using the rotating part as an axis relative to the lamp head by the pivot assembly in order to adjust angles towards different directions. In this way, the solar power supply module can rotate and adjust the angle that faces the sun according to the different irradiation angles of the sunlight in different seasons, so as to achieve a better light collection effect and improve the charging efficiency.

In addition, the positioning stand of this disclosure integrates several positioning functions and can use a plurality of screws or nails to fix the spotlight to a column, a wall, or any plane, or plug the spotlight on the ground of a garden walkway, or the hook part at the joint position of the rod body and the two pivot rods for hanging and positioning the spotlight, so as to improve the convenience of use.

The technical characteristics of this disclosure will become apparent with the detailed description of preferred embodiments accompanied with the illustration of related drawings.

DETAILED DESCRIPTION OF THE DISCLOSURE

Figure 1:
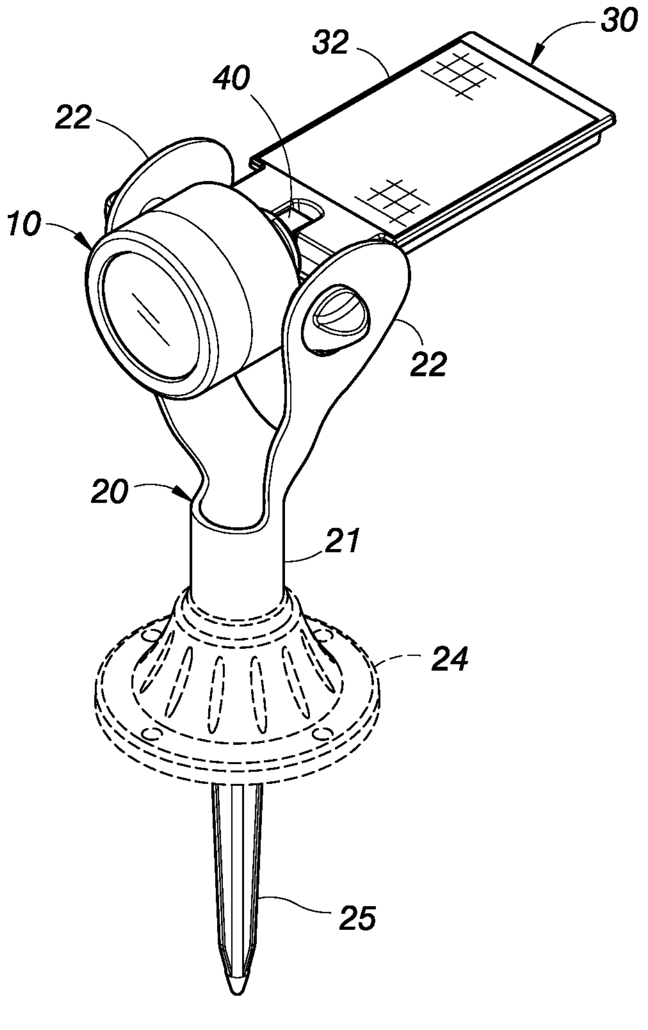
FIG. 1 is a perspective view of this disclosure.

With reference to FIGS. 1 to 4 for an adjustable solar spotlight with various fixing methods in accordance with this disclosure, the adjustable solar spotlight includes a lamp head 10, a positioning stand 20 for pivoting the lamp head 10, a solar power supply module 30 disposed at the back of the lamp head 10, and a pivot assembly 40 pivotally connected between the lamp head 10 and the solar power supply module 30.

The bottom of the positioning stand 20 is provided with a rod body 21, and the top end 211 of the rod body 21 is upwardly split and outwardly extended to form two pivot rods 22 which are arranged substantially into a V-shape, and a hook part 23 is formed at a joint position of the top end 211 of the rod body 21 and the two pivot rods 22 and provided for hanging.

The lamp head 10 includes a casing 11 installed between the two pivot rods 22, and the casing 11 has an illuminated front 112, a back 113 configured to be opposite to the front 112, and two sides 111 disposed between the front 112 and the back 113. The two sides 111 of the casing 11 are respectively and pivotally connected to the adjacent pivot rods 22, so that the illuminated front 112 of the lamp head 10 can be deflected upwardly or downwardly relative to the positioning stand 20 to provide different lighting angles.

The solar power supply module 30 includes a main body 301 electrically connected to the lamp head 10, and the main body 301 includes an assembling part 31, a solar panel 32 mounted onto the top side of the main body 301, a switch 33 installed at the bottom side of the main body 301 for controlling the lamp head 10 to emit light, and a battery 34 installed in the main body 301 and disposed between the top side and the bottom side, and the solar panel 32, the switch 33 and the battery 34 are electrically connected to one another, and the battery 34 can store electric power and supply the electric power required for the operation of the lamp head 10.

The pivot assembly 40 is installed between the back 113 of the casing 11 of the lamp head 10 and the assembling part 31 of the solar power supply module 30, and the pivot assembly 40 has two ends communicated with each other, and one of the ends is axially connected to the back 113 of the casing 11 of the lamp head 10 by a rotating part 41, such that the solar power supply module 30 can be rotated using the rotating part 41 as an axis relative to the lamp head 10.

The other end of the pivot assembly 40 is pivotally connected to the assembling part 31 of the solar power supply module 30 by a pivot part 42, such that the solar power supply module 30 can be deflected upwardly or downwardly relative to the lamp head 10 through the pivot part 42, so as to adjust angles towards different directions to receive and convert solar radiation into electrical energy for charging the battery 34.

Figure 5:
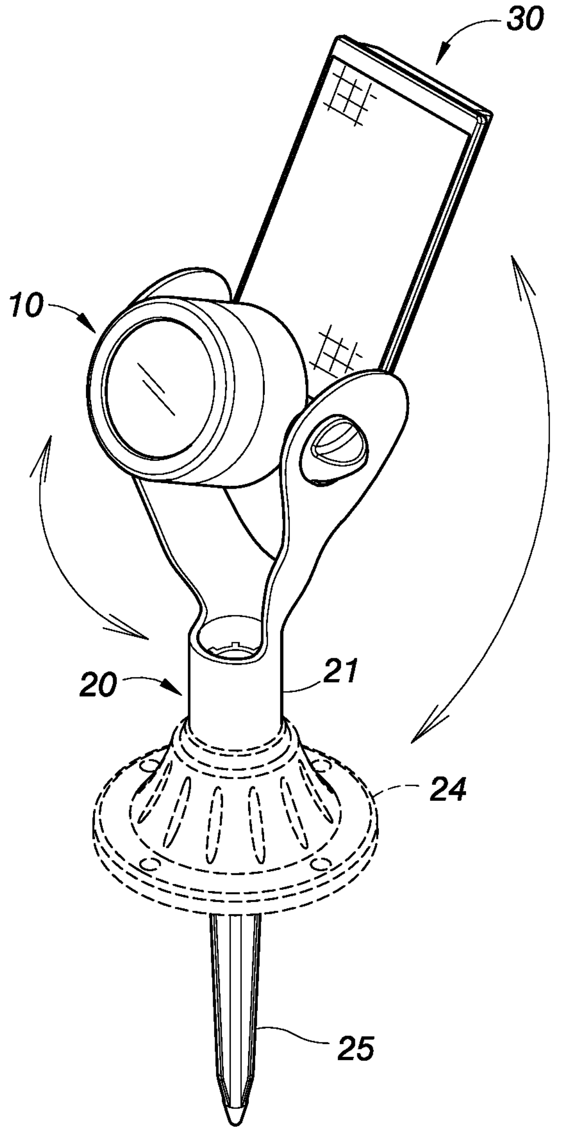
FIG. 5 is a schematic view showing that a main light of this disclosure on the positioning stand deflects upward, and a solar power supply module deflects upward and downward relative to the main light.
Figure 6:
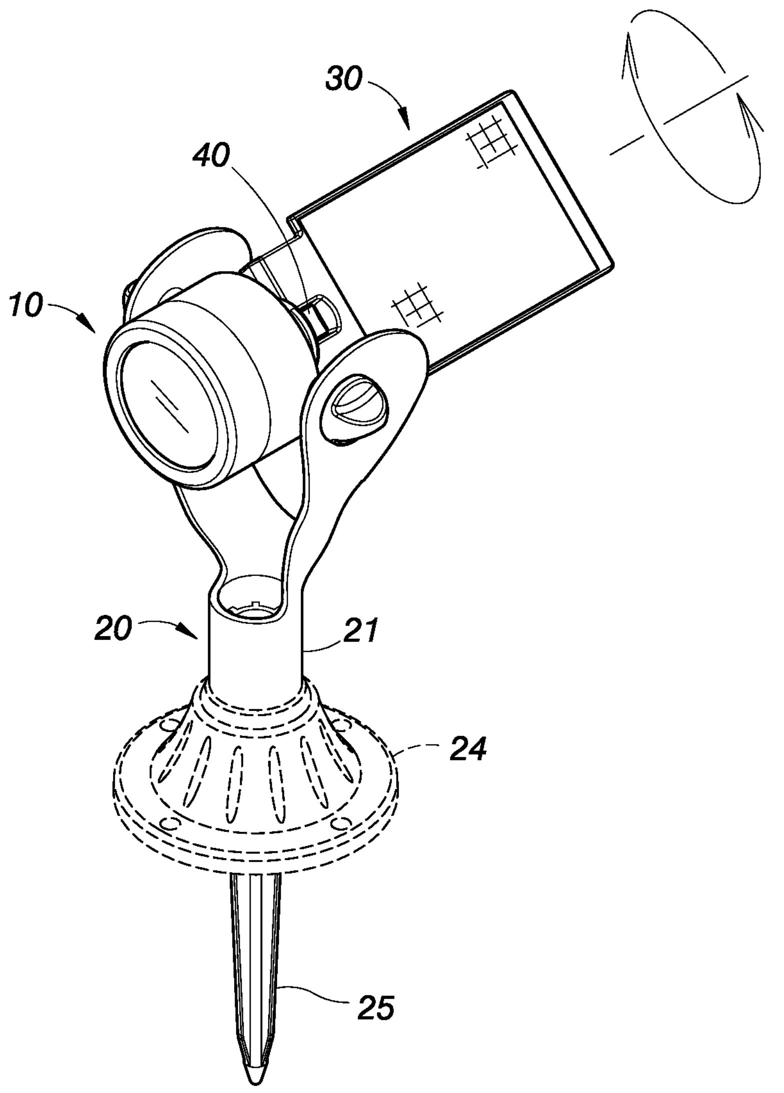
FIG. 6 is a schematic view showing that a solar power supply module of this disclosure rotates using a pivot assembly as an axis.

By the above structure, the solar power supply module 30 of this disclosure can be deflected upwardly or downwardly relative to the lamp head 10 by the pivot part 42 of the pivot assembly 40, or axially rotated using the rotating part 41 as an axis relative to the lamp head 10, so as to adjust angles towards different directions. As described above, the lamp head 10 can be deflected upwardly or downwardly relative to the positioning stand 20 to provide different lighting angles, so that in an operation as shown in FIG. 5, a user can adjust the lamp head 10 to be deflected upwardly relative to the positioning stand 20 and the solar power supply module 30 to be deflected upwardly relative to the lamp head 10 to provide lighting; or as shown in FIG. 6, the solar power supply module 30 is axially rotated using the pivot assembly 40 as an axis relative to the lamp head 10 to allow the solar power supply module 30 to be rotated and adjusted to an angle facing the sun according to the different irradiation angle of sunlight in different seasons, so as to achieve a better light collection effect and improve the charging efficiency.

In addition, the positioning stand 20 integrates various positioning functions, and the bottom end of the rod body 21 is removably mounted with a positioning seat 24 and a plug-in part 25. This disclosure can fix the positioning seat 24 of the spotlight to a column, a wall, or any plane by a plurality of screws or nails, or plug the spotlight into the soil ground of a garden walkway by the plug-in part 25 to make this disclosure serve as a garden lamp or a walkway lamp.

Figure 7:
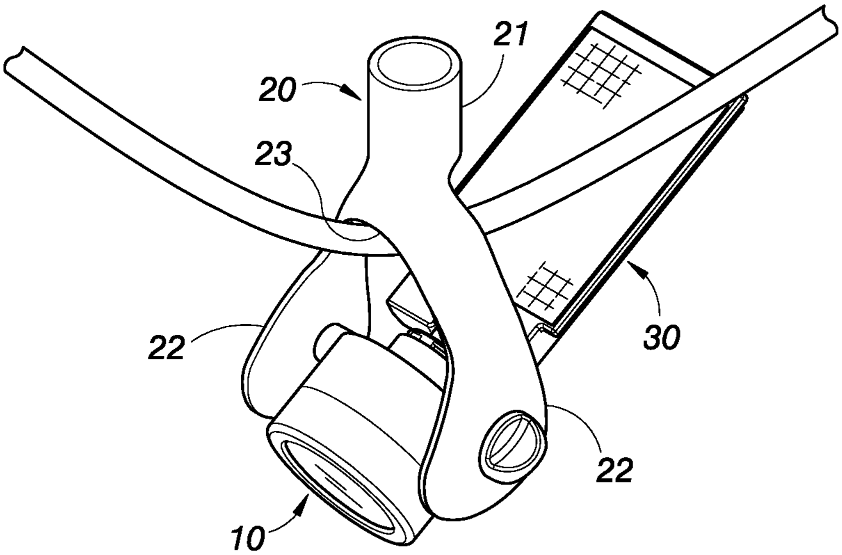
FIG. 7 is a schematic view showing that a positioning stand of this disclosure positions a lamp head by a suspension method.

When this disclosure is used in a place where the screws or nails cannot be used for fixation, the users can use a rope, a long rod, a hook or even a tree branch to fix the hook part 23 to hang and positioning the spotlight as shown in FIG. 7, so as to improve the convenience of use.

During implementation, the rod body 21 of the positioning stand 20 and the two pivot rods 22 can be made of metal or integrally formed by plastic injection molding, and the angle included between the two pivot rods 22 is preferably not greater than 90 degrees, so that the hook part 23 can be stably positioned after hanging.

Figure 2:
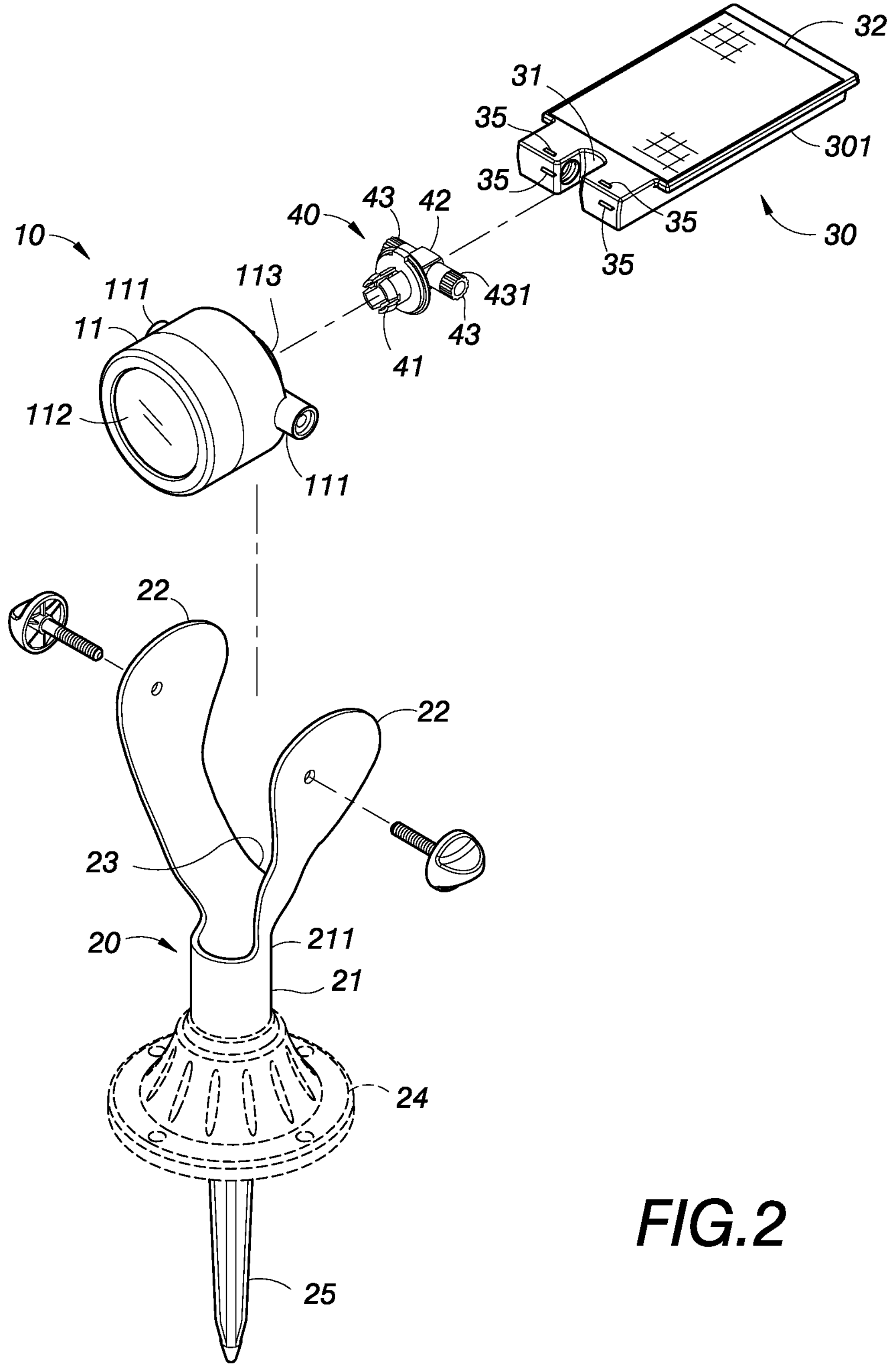
FIG. 2 is an exploded view of this disclosure.
Figure 3:
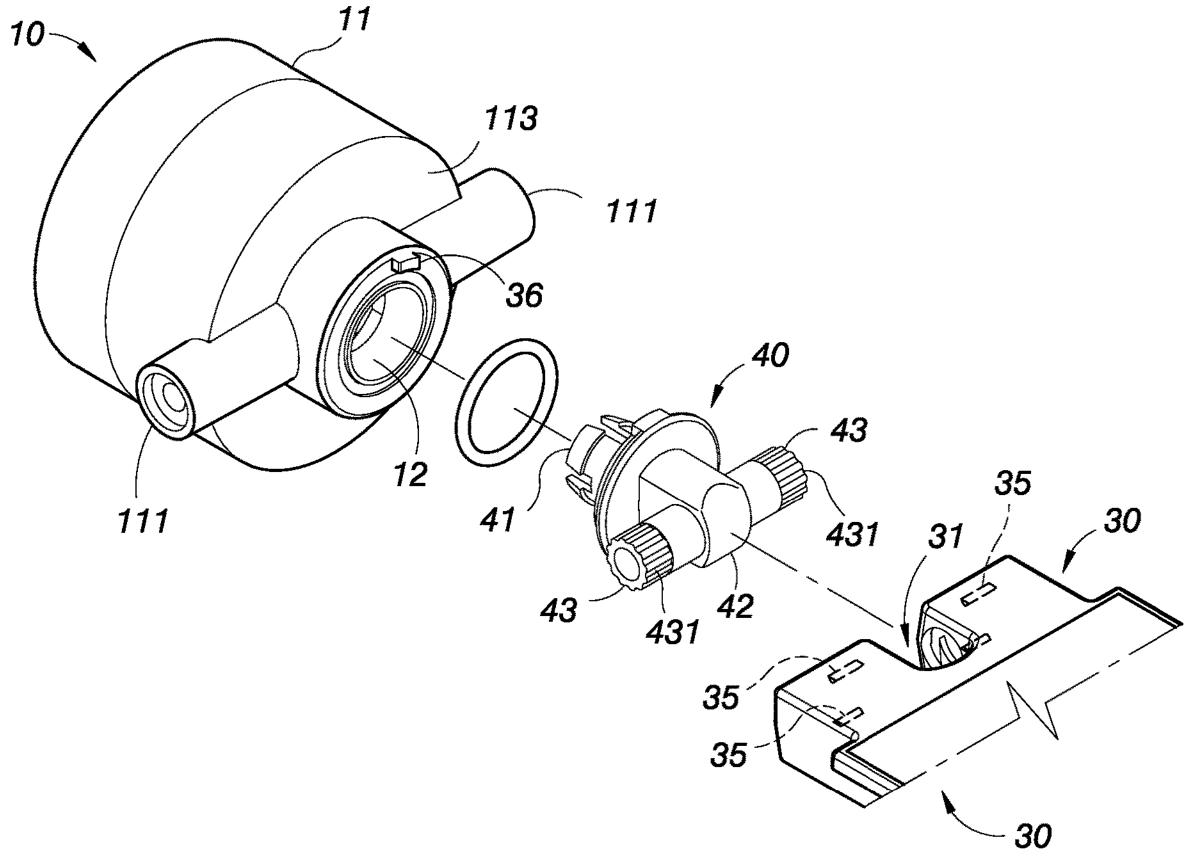
FIG. 3 is a partial exploded view of this disclosure.
Figure 4:
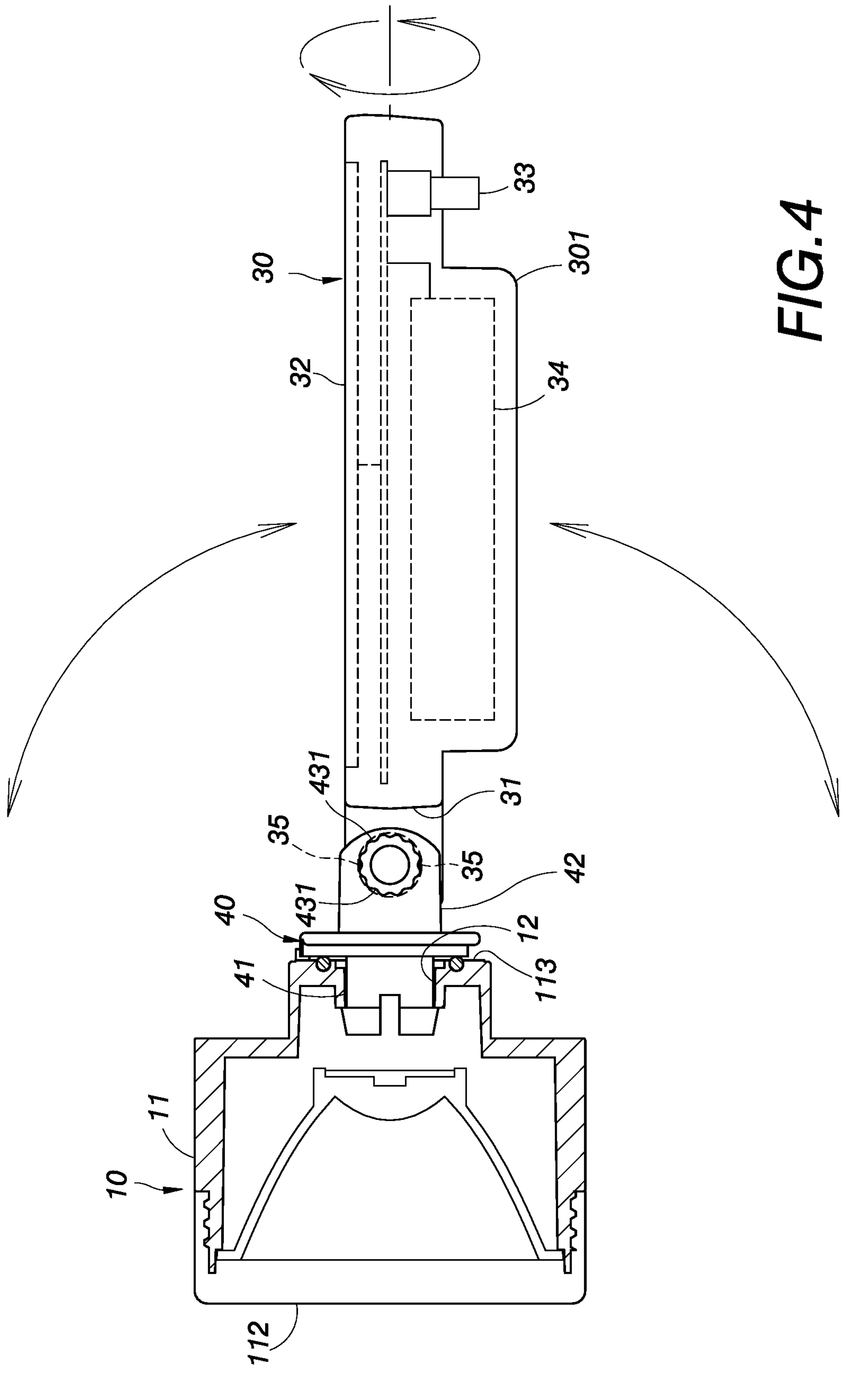
FIG. 4 is a cross-sectional view of this disclosure.

The implementation of the solar power supply module 30 and the pivot assembly 40 are further illustrated by FIGS. 2 and 3 and described as follows:

During implementation, the assembling part 31 of the solar power supply module 30 is groove-shaped, and two sides of the pivot part 42 of the pivot assembly 40 are provided with a shaft 43, and the groove-shaped assembling part 31 of the solar power supply module 30 is pivotally connected, so that the solar power supply module 30 can be deflected upwardly or downwardly using the shaft 43 as an axis relative to the lamp head 10, and the deflection angle is not greater than 180 degrees.

The shaft 43 has a plurality of positioning grooves 431 formed around the outer periphery of the shaft 43 and arranged equidistantly in a round shape, and the inner periphery of the groove-shaped assembling part 31 has at least one elastic bump 35 configured to be opposite to the plurality of positioning grooves 431 of the shaft 43. After the pivot part 42 is rotated using the shaft 43 as an axis, the elastic bump 35 can be elastically latched into any one of the positioning grooves 431 for positioning and producing an obvious feeling of mechanical stages.

In addition, the back 113 of the casing 11 of the lamp head 10 is formed with a shaft hole 12, and the rotating part 41 of the pivot assembly 40 in in the shape of a round rod with two ends, and one of the ends is axially installed into the shaft hole 12, and the other end is fixed to the pivot part 42, so that the solar power supply module 30 can be rotated using the rotating part 41 of the pivot assembly 40 as an axis relative to the lamp head 10.

In order to prevent the power cable electrically connected between the solar power supply module 30 and the lamp head 10 from being bent or twisted too much, a stopper 36 is installed between the solar power supply module 30 and the pivot assembly 40, and the stopper 36 can restrict the rotation angle of the solar power supply module 30 using the rotating part 41 as an axis for the rotation within 360 degrees.

While the disclosure has been described by means of specific embodiments, numerous modifications and variations could be made thereto by those skilled in the art without departing from the scope and spirit of the disclosure as set forth in the claims.

What is claimed is:

1. An adjustable solar spotlight with various fixing methods, comprising:

a lamp head, further comprising a casing, and the casing having an illuminated front, a back configured to be opposite to the front, and two sides disposed between the front and the back;

a positioning stand, having a rod body disposed under the positioning stand, and the rod body having a top end and a bottom end, and the top end of the rod body being split and extended outwardly to form two pivot rods arranged in a substantially V-shape, and the lamp head being installed between the two pivot rods, and two sides of the casing being respectively and pivotally coupled to the pivot rods, such that the front of the lamp head can be deflected towards the top or bottom relative to the positioning stand to provide lighting, and a hook part provided for hanging being formed at a joint position of the top end of the rod body and the two pivot rods;

a solar power supply module, having a main body electrically coupled to the lamp head, and the main body having an assembling part; and a pivot assembly, installed between the back of the lamp head casing and the assembling part of the solar power supply module, and having two ends communicated with each other, and one of the ends being axially coupled to the back of the lamp head casing by a rotating part, such that the solar power supply module can use the rotating part as an axis to rotate relative to the lamp head, and the other end of the pivot assembly being pivotally coupled to the assembling part of the solar power supply module by a pivot part, such that the solar power supply module can be deflected upwardly or downwardly relative to the lamp head through the pivot part, so as to adjust angles towards different directions to receive and convert solar radiation into electrical energy to charge a battery.

2. The adjustable solar spotlight with various fixing methods according to claim 1, wherein the main body of the solar power supply module has a top side installed with a solar panel and a bottom side installed with a switch, and a battery is installed in the main body and between the top side and the bottom side, and battery, the solar panel, the switch and the battery are electrically coupled to one another.

3. The adjustable solar spotlight with various fixing methods according to claim 1, wherein the assembling part of the solar power supply module is in the shape of a groove, and two sides of the pivot part of the pivot assembly are provided with a shaft separately and pivotally coupled to the groove-shaped assembling part of the solar power supply module, such that the solar power supply module can be upwardly or downwardly deflected using the shaft as an axis relative to the lamp head, and the deflection angle does not exceed 180 degrees.

4. The adjustable solar spotlight with various fixing methods according to claim 3, wherein the shaft comprises a plurality of positioning grooves formed at an outer periphery thereof and arranged equidistantly in a round shape, and the groove-shaped assembling part comprises at least one elastic bump disposed at an inner periphery thereof and configured to be opposite to the plurality of positioning grooves of the shaft, and after the pivot part rotates using the shaft as an axis, the elastic bump can be elastically latched to any one of the positioning grooves for positioning.

5. The adjustable solar spotlight with various fixing methods according to claim 1, wherein the back of the casing of the lamp head is provided with a shaft hole, and the rotating part is substantially in a rod shape with two ends, one of the ends being axially installed into the shaft hole, and the other end being fixed to the pivot part, such that the solar power supply module can rotate using the rotating part of the pivot assembly as an axis relative to the lamp head.

6. The adjustable solar spotlight with various fixing methods according to claim 1, further comprising a stopper disposed between the solar power supply module and the pivot assembly, and provided for restricting the rotation angle of the solar power supply module that rotates using the rotating part as an axis from exceeding 360 degrees.

7. The adjustable solar spotlight with various fixing methods according to claim 1, wherein the bottom end of the rod body of the positioning stand is removably installed with a positioning seat that can be fixed onto any plane, and a plug-in part that can be plugged into the ground.

* * * * *